United States Patent [19]

Scianna, Sr. et al.

[11] 4,326,660
[45] Apr. 27, 1982

[54] COMBINED CASSETTE TAPE GUIDE AND TAPE STRIPPER

[75] Inventors: Anthony Scianna, Sr., Morton Grove; Frank J. Gordon, Chicago, both of Ill.

[73] Assignee: Motorola Inc., Schaumburg, Ill.

[21] Appl. No.: 147,792

[22] Filed: May 8, 1980

[51] Int. Cl.³ .......................................... B65H 17/20
[52] U.S. Cl. ................................... 226/190; 226/181; 242/199
[58] Field of Search ....................... 226/181, 183, 190; 242/200, 199, 198, 206, 208-210

[56] References Cited

U.S. PATENT DOCUMENTS 3,419,226 12/1968 Sato .................................... 242/199
3,462,057 8/1969 Yamamoto .......................... 226/181

FOREIGN PATENT DOCUMENTS 717030 10/1954 United Kingdom .
1271422 4/1972 United Kingdom .
1348455 3/1974 United Kingdom .
1486628 9/1977 United Kingdom .
2042786 1/1980 United Kingdom .

Primary Examiner—Leonard D. Christian
Attorney, Agent, or Firm—James W. Gillman; James S. Pristelski; Phillip H. Melamed

[57] ABSTRACT

A cassette tape player (11) has an integral combined tape guide and stripper (32) which is mounted adjacent to a capstan shaft (26) and has an end portion (52) that extends beyond a free upstanding end (38) of the capstan shaft and effectively forms a guide plane for insuring that when a cassette housing (12) containing a tape (15) is inserted into the tape player, the tape will be positioned between the capstan shaft and a pressure roller (29) which is selectively, linearly movable toward and away from the capstan shaft. The tape guide and stripper is fixed to the tape player frame (19) and includes stripper portion (54, 55) which partially surround the section (39) of the capstan shaft that will contact an inserted tape, but still permit selective engagement with the movable pressure roller such that the tape will be pressed between the capstan and pressure roller while the stripper portions prevent the tape from being wrapped around the capstan shaft.

12 Claims, 3 Drawing Figures

COMBINED CASSETTE TAPE GUIDE AND TAPE STRIPPER

BACKGROUND OF THE INVENTION

The present invention generally relates to the field of cassette tape players or recorders in which a tape-carrying cassette housing (cartridge) having tape disposed on and between two reels is inserted into the tape player such that the tape player creates controlled driving movement of the tape by positioning the tape between a driven capstan shaft and a rotatable pressure roller, with both the capstan shaft and pressure roller being part of the tape player, wherein the pressure roller is selectively moved into contact with the capstan shaft while frictionally pressing the inserted tape between the pressure roller and capstan shaft. Such reel-to-reel cassette tape players are well known and readily commercially available. These types of tape players should be contrasted with "eight-track cartridge" tape players in which an endless loop tape is provided on one reel in an insertable tape carrier cartridge (housing) that contains its own pressure roller while the tape player contains an upstanding capstan shaft but does not have its own pressure roller to captivate the tape between it and the capstan shaft.

In cassette-type tape players, typically the cassette and tape are inserted over a free upstanding end of a capstan shaft, and subsequently a freely rotatable pressure roller is laterally moved into operative position so as to continuously frictionally press the tape in the cassette housing against the capstan shaft. By driving the capstan shaft, driving movement is provided to the tape wherein the capstan shaft provides an accurately speed-controlled movement for the tape which is necessary for accurate reproduction of sounds magnetically recorded on the tape. Typically the tape player has at least one spoked hub which coacts with one reel in the cassette housing to act as a tape take-up reel.

Generally, the tape player contains one or more cassette housing guides which typically comprise upstanding projections which mate with openings in the cassette housing so as to accurately position the cassette housing within the tape player. This accurate positioning is necessary since the tape must be accurately aligned with a magnetic recording/playback head contained in the tape player.

Such prior tape players have not provided any guide mechanism for guiding the tape within the cassette housing into a proper position with respect to the capstan shaft during the insertion of the cassette housing into the tape player. Because of this, these prior tape players are subject to a failure mode caused by the insertion of the cassette housing into the tape player wherein the tape within the housing may end up on the wrong side of the capstan shaft such that it will not be sandwiched between the capstan shaft and the pressure roller. This will result in failing to provide any driving movement to the tape by the capstan shaft and requires the ejection of the cassette housing and its reinsertion to hopefully correct this defective condition. This failure mode is most likely to occur when tapes of extremely thin thickness are utilized since the tape will then be subject to more movement within the cassette housing so that it is possible to misalign this tape with respect to the capstan shaft even though the cassette housing is properly positioned by the existing cassette housing guides in the tape player.

In addition, cassette tape players or recorders of the type described above have not provided any tape stripper member which prevents the driven tape from being wrapped around the capstan shaft due to the tape sticking to the capstan shaft. Such tape strippers have been utilized in conjunction with eight-track tape players and U.S. Pat. Nos. 3,581,966 and 3,734,373 illustrate such eight-track tape stripper members wherein both of these patents are assigned to the same assignee as the present invention. In eight-track tape players, since the pressure roller is carried by the inserted eight-track cartridge, essentially, 180° of angular space is available surrounding the eight-track capstan shaft for disposing the tape stripper and therefore there are essentially no restraints on the size of the tape stripper member since the eight-track cartridge and tape will be disposed only on one side of the capstan shaft thus leaving substantial space on the other side of the capstan shaft for the tape stripper member. Such design freedom in designing the tape stripper member is not possible in a cassette-type tape player since portions of the cassette housing are present on both sides of the capstan shaft.

SUMMARY OF THE INVENTION

An object of the present invention is to provide an improved cassette tape player which includes a tape guide for insuring the positioning of inserted tape between a capstan shaft and a pressure roller both contained in the cassette tape player.

A further object of the present invention is to provide a cassette tape player having a tape guide element for guiding an inserted tape between a capstan shaft and pressure roller contained in the tape player while also functioning as a tape stripper member to prevent the undesired wrapping of tape around the capstan shaft.

In one embodiment of the present invention, an improved cassette tape player is provided, comprising: a tape player frame; at least one capstan shaft means rotatable with respect to said frame about an axis for providing tape driving movement to a tape to be inserted into said tape player, said capstan shaft means having a free upstanding end portion, an opposite end portion mounted to said frame, and an engaging portion between said end portions for drivingly engaging the inserted tape; at least one pressure roller means mounted to said frame and freely rotatable about an axis parallel to said capstan shaft axis, said pressure roller means disposed on one side of said capstan shaft axis and movable with respect to said capstan shaft means between a first position wherein said capstan shaft means and said pressure roller means are spaced apart and a second position wherein said pressure roller effectively contacts said tape engaging portion of said capstan shaft, said pressure roller means selectively frictionally captivating an inserted tape between said pressure roller means and said capstan shaft means in said second position for allowing said capstan shaft means to provide driving movement to said inserted tape; and tape guide means mounted adjacent to said capstan shaft, said tape guide means generally extending from said mounted end portion of said capstan shaft means to said free upstanding end portion of said capstan shaft means, said tape guide means including a first end portion extending beyond said free upstanding capstan shaft end portion with said guide first end portion effectively forming a tape guide plane beyond said capstan shaft free end portion which is inclined with respect to said capstan axis, and wherein said first end portion of said tape guide means positively positions inserted tape on said one side of said capstan shaft between said capstan shaft axis and said pressure roller axis with said capstan shaft means and said pressure roller means in said first position.

Essentially, the tape guide means comprises a cylindrical base which is press fit around a cylindrical bearing for the capstan shaft with the base and bearing fixed to the tape player frame. The guide means includes a cylindrical extension, partially open on said one side, which extends from the base and terminates in the first end portion which lies beyond the free upstanding end portion of the capstan shaft, wherein the guide first end portion forms an inclined guide plane which ensures that inserted tape will always be positioned on said one side of the capstan shaft. The term "side" refers to a preferred 180° of angular disposition about the capstan shaft axis wherein within the 180° of angular disposition of said one side the tape player pressure roller means is located. By providing for guiding the inserted tape, the present invention eliminates the failure mode of having the inserted tape being located behind (on the "other" side of) the capstan shaft such that when the pressure roller contacts the capstan shaft the inserted tape is not pressed between these elements to provide driving movement thereto.

In addition, the present invention contemplates having the tape guide means include tape stripper portions which comprise side projections of the guide means located between the first end portion and the base of the guide means. These tape stripper portions are positioned in close proximity to the tape engaging portion of the capstan shaft and by virtue of this positioning prevent any undesired wrapping of the tape around the capstan shaft means while permitting the pressure roller means to contact the capstan shaft means.

BRIEF DESCRIPTION OF THE DRAWINGS

For a more complete understanding of the present invention, reference should be made to the drawings, in which.

DESCRIPTION OF THE PREFERRED EMBODIMENT

Figure 1:
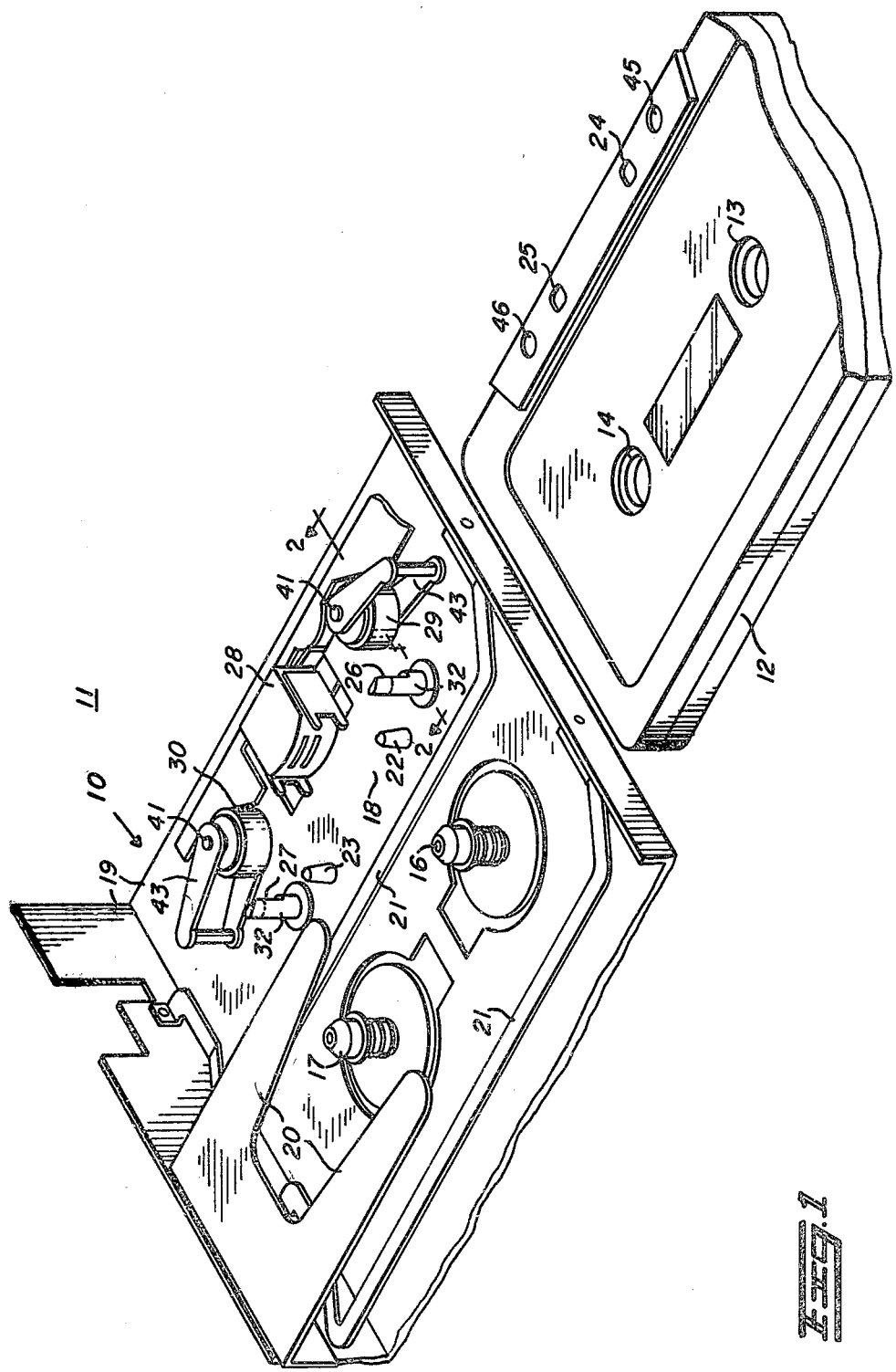
FIG. 1 is a perspective view of a cassette housing and a tape deck of a two capstan shaft cassette tape player.

FIG. 1 illustrates a tape deck 10 of an improved cassette tape player 11 wherein the tape player 11 comprises the tape deck 10 along with an exterior housing (not shown) and tape player control levers (also not shown). FIG. 1 also illustrates a tape carrying cassette housing 12 which has first and second tape reels 13 and 14 on and between which a magnetic tape 15 is wound. The tape deck 10 receives the cassette housing 12 carrying the tape 15 on first and second take-up reel hubs 16 and 17 which are disposed above a planar portion 18 of a tape deck frame 19. Essentially the take-up reel hubs 16 and 17 engagingly fit within inner portions of the first and second cassette housing reels 13 and 14.

The tape deck 10 comprises vertically movable positioning members 20 and 21 which together form a cassette housing receiving cavity which receives the inserted cassette housing and provides for general horizontal location of the housing as well as providing for vertical movement of the housing downward (as viewed in FIG. 1) onto the take-up reel hubs 16 and 17 during an insertion cycle, and upward movement of the cassette housing during an ejection cycle. A pair of housing locating projections 22 and 23 protrude upward from the planar portion 18 of the tape deck frame 19. The locating projections 22 and 23 have pointed salient portions which are received in corresponding locating holes 24 and 25 in the cassette housing 12 and ensure the proper lateral positioning of the cassette housing when it has been moved vertically downward onto the take-up reel hubs 16 and 17.

The tape deck in FIG. 1 is illustrated as comprising an auto reverse tape deck which means that it comprises a pair of capstan shafts 26 and 27 (comprising cylindrical rods) which are intended to provide the driving movement for driving the tape 15 in the cassette housing 12 at a constant speed past a magnetic tape head 28 in either a forward or reverse direction as desired by the operator of the tape deck. A pair of pressure (pinch) rollers 29 and 30 selectively cooperate with the capstan shafts 26 and 27 to provide for selectively pressing the tape 15 in the cassette housing against either one of the capstan shafts in order to implement either a forward or reverse normal play movement of the tape 15 past the magnetic head 28. The operation of all of the above-mentioned elements is conventional and well known to those of skill in the art.

Figure 2:
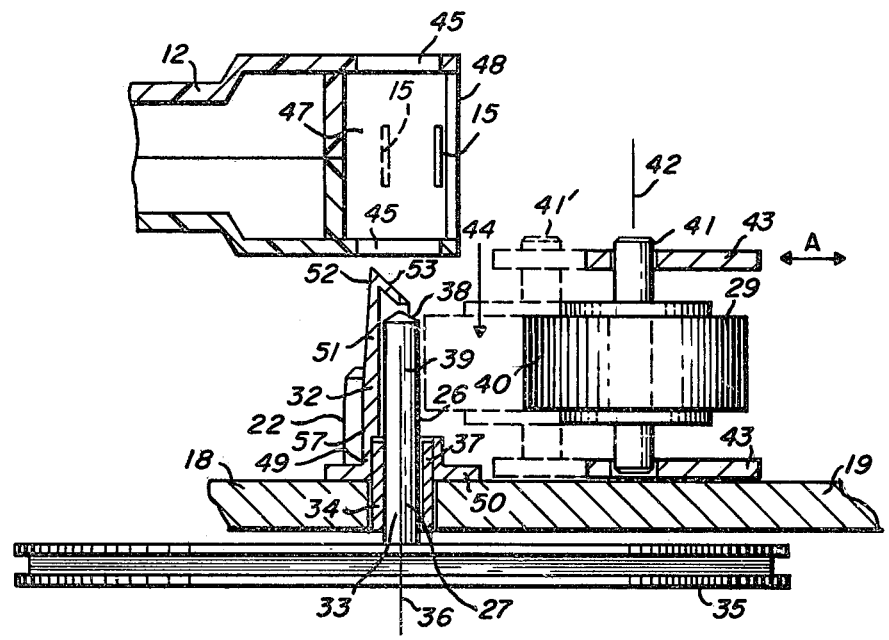
FIG. 2 is a cross-sectional view of the tape deck shown in FIG. 1 with a cassette housing carrying a tape illustrated as being ready for insertion onto the tape deck.

Referring now to FIG. 2, a cross-sectional view of a portion of the tape deck 10 is illustrated with respect to how a tape guide element 32 provides for guiding the tape 15 upon insertion of the cassette housing 12 onto the tape deck 10, and how the guide 32 also performs a tape stripping action for the tape as it is being driven by the capstan shaft. In FIG. 2 the capstan shaft 26 is illustrated as a cylindrical rod having a first end portion 33 mounted to the frame 19 by being mounted inside a cylindrical tubular bearing 34 fixed to the frame 19. Below the frame 19 the first end portion 33 is fixed to a flywheel 35 that is intended to be rotationally driven by a motor driven belt (not shown). The capstan shaft 26 is rotatable about a capstan shaft axis of rotation 36 which essentially corresponds to the longitudinal dimension of the shaft 26. The bearing 34 has a protruding portion 37 which extends above the planar portion 18 of the tape deck frame, and the capstan shaft 26 extends upward from the protruding bearing portion 37 and terminates at a free upstanding end portion 38. Between the bearing 34 and the end portion 38, the capstan shaft 26 has a tape-engaging portion 39 which is intended to cooperate with the pressure roller 29 to selectively frictionally contact the magnetic tape 15 between these elements so as to provide accurately controlled driving movement to the tape 15 by virtue of the driving rotation of the capstan shaft 26.

The pressure roller 29 comprises a freely rotatable wheel 40 which is mounted on a post 41 having a longitudinal axis 42, and the wheel 40 is freely rotatable about the axis 42 with the axis 42 being substantially parallel to the capstan shaft axis 36. The post 41 is mounted to a movable pressure roller bracket 43 that is intended for substantially linear movement with respect to the tape frame 19 and capstan shaft 16 in the directions indicated by the arrows A such that this movement is essentially parallel to the plane of the planar portion 18. The bracket 43 is contemplated as being movably attached to the frame 19. By stating that the wheel 40 of the pressure roller is freely rotatable, this is to be contrasted with the movement of the capstan shaft 26 which is intended to be driven via the belt drive of a motor.

The pressure roller assembly, which comprises the pressure roller 29 and the elements 40 through 43, is illustrated in FIG. 2 in a first position in which the wheel 40 is spaced apart from the capstan 26 such that a gap 44 exists between these elements. This position corresponds to the position of these elements prior to the insertion of the cassette housing 12 onto the tape deck 10. It is contemplated that after the insertion of the housing 12 onto the tape deck, the bracket 43 will move towards the capstan shaft 26 into a second position (indicated in general by the dashed broken portion 41' of the post 41) such that the wheel 40 will contact the shaft 26 while pressing and thereby frictionally captivating the magnetic tape 15 between the wheel 40 and the tape engaging portion 39 of the capstan shaft such that the capstan shaft 26 will provide controllable driving movement to the tape 15.

The cassette housing 12 includes circular receiving openings 45 and 46 wherein during insertion of the cassette housing onto the tape deck, the capstan shaft 26 will protrude through one of these openings into an interior cavity 47 of the cassette housing. The cassette housing 12 also has an additional receiving opening 48 through which the pressure roller wheel 40 can protrude (after loading the cassette into the tape player) to coact with the capstan shaft 26 within the interior cavity 47 so as to operatively engage the magnetic tape 15 against the capstan shaft 26 for driving movement thereby.

The operation and structure of all of the elements described previously, with the exception of the tape guide element 32, is conventional and well known to those of skill in the art. Essentially, upon insertion of the cassette housing 12 onto the tape deck, the magnetic tape 15 will be positioned upon the proper "side" of the capstan shaft 26 such that during the subsequent movement of the pressure roller bracket 43, the roller wheel 40 will press the magnetic tape 15 against the engaging portion 39 of the capstan shaft such that the capstan will then drive the tape 15 at a predetermined speed past the magnetic tape head 28 shown in FIG. 1.

Typically, the magnetic tape 15 would be positioned in the cassette housing 12 as shown by the solid lines in FIG. 2 such that upon insertion of the cassette housing, the tape 15 would be normally located on the proper "side" of the capstan shaft 26, with the proper side being defined as the side of the capstan shaft on which the pressure roller is disposed. The term "side" is used to designate a 180° angular position with respect to the rotational axis 36 of the capstan shaft 26. In FIG. 2 the proper side corresponds to positioning the magnetic tape 15 on the right side of the capstan shaft axis 36 thereby positioning the tape between the capstan shaft and the pressure roller with these elements in their first position.

Prior tape decks did not utilize any element corresponding to the tape guide 32 and therefore failed to prevent occasional positioning of the magnetic tape 15 on the improper (left as viewed in FIG. 2) "side" of the capstan shaft axis 36 after inserting the housing 12 onto the capstan shaft 26. This would be caused by having the tape 15 located as shown dashed in FIG. 2 prior to insertion. The resulting failure mode required the operator of the tape deck to remove the inserted cassette housing and attempt reinsertion in order to properly position the magnetic tape between the capstan shaft 26, which is fixed with respect to the frame 19, and the pressure roller wheel 40 which is only substantially linearly movable with respect to the frame 19. This failure mode upon insertion of the cassette housing onto the tape deck is totally prevented by the tape guide element 32 as will now be discussed.

The tape element 32 comprises a cylindrical tubular base portion 49 which is intended to be press fit mounted over the protruding portion 37 of the capstan shaft bearing 34. One end of the tape guide element 32 comprises an annular flange 50 which extends around the tubular base portion 49 and is intended for direct flush contact with the planar portion 18 of the frame 19. Preferably, some sort of fixing compound will be applied to the bottom of the flange 50 such that it will be fixed to the frame 19 so as to prevent any rotation of the element 32 after assembly. By press fitting the tubular base portion 49 over the capstan shaft bearing 34, alignment of the tape guide 32 with respect to the capstan shaft 26 can be extremely accurately controlled since the shaft 26 is precisely aligned with respect to its bearing 34.

Constructing the guide 32 of a plastic material for a press fit over the protruding portion of the bearing, as described above, allows the use of the guide with previously manufactured tape decks to correct the tape positioning problem in those decks. It is contemplated that new tape decks should be constructed so that the capstan bearing will fit within the guide base, and then the entire assembly is fixed to the tape player frame.

The tape guide element 32 is preferably an integral unit and comprises an extending portion 51 which extends from the cylindrical base 49 (and therefore generally from the capstan shaft end 33) upward in the direction of the capstan shaft longitudinal axis 36 and terminates in an end portion 52 which effectively forms a tape guide plane by a planar exterior surface 53. The guide plane and surface 53 are inclined with respect to the capstan shaft axis 36 and are located above and beyond the free upstanding end portion 38 of the capstan shaft 26. The planar guide surface 53 formed by the end portion 52 will prevent the tape 15 from being positioned on the improper (left with respect to axis 36 as viewed in FIG. 2) side of the capstan shaft axis 36, since upon insertion of the cassette housing 12 the magnetic tape 15 would be guided by the inclined planar surface 53 so as to force the magnetic tape 15 to the right of the shaft axis 36 and therefore ensure that the magnetic tape would be positioned between the pressure roller wheel 40 and the capstan shaft 26. It is contemplated that the guide plane formed by the end portion 52 is disposed over at least a portion of the upward projection of the capstan shaft 26 in the direction of the capstan shaft axis 36.

It is contemplated that the extending portion 51 of the tape guide element 32 will have side stripper portions 54 and 55 which are positioned adjacent and in relatively close proximity to the tape engaging portion 39 of the capstan shaft 26 to act as tape stripper elements so as to help prevent the magnetic tape 15 from being wound around the back (improper) side of the capstan shaft 26 when the magnetic tape 15 has been initially properly positioned to the right of the capstan shaft 26, by the inclined guide portion 52 of the tape guide element 32, and the tape is driven the capstan shaft 26. The tape stripper portions 54 and 55 help prevent the tape 15 from being wrapped around the capstan shaft 26 during driving of the tape 15 by the capstan by essentially ensuring that the tape 15 is stripped away from the capstan shaft after the tape has contacted the shaft and the shaft has imparted driving movement to the tape.

It should be noted that it is contemplated that the extending portion 51 and stripper portions 54 and 55 of the tape guide element 32, while partially surrounding the capstan shaft 26, will of course provide an opening 56 (see FIG. 3) so as to allow exposure of the proper side of the tape engaging portion 39 of the capstan shaft 26 to the pressure roller wheel 40. It is also contemplated that the extending portion 51 will have an exterior surface 57 which effectively forms a tapered surface about the capstan shaft and inclined at approximately 3° with respect to the capstan shaft axis 36 such that the tape guide 32 will perform a rough guiding action for the cassette housing 12, while the locating pins 22 and 23 will still provide the primary guiding movement for the cassette housing. Of course, it is possible that the tape guide elements 32, which are contemplated as being mounted adjacent to both of the capstan shafts 26 and 27, could provide the sole guiding elements for positioning the cassette housing 12.

It should be noted that it is contemplated that the tape guide element 32 will have an end portion 52 located above the free end portion of the capstan shaft 26 and that the tape guide element end portion 52 and the capstan shaft portions 38 and 39 will both be inserted into the appropriate receiving openings 45, 46 of the cassette housing 12.

It should be noted that elements 54 and 55 comprise a pair of stripper portions which provide tape stripping action regardless of the rotational direction of the capstan shaft 26. Also note that the opening 56 is between the stripper portions and is disposed to face the pressure roller wheel 40.

Figure 3:
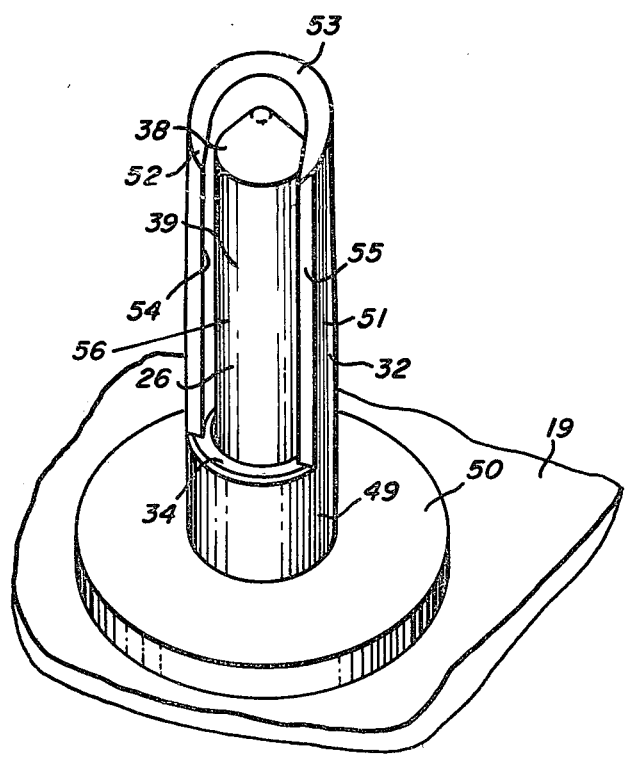
FIG. 3 is a perspective view of a capstan shaft and tape guide assembly constructed according to the present invention.

While I have described and shown a specific embodiment of this invention, further modifications and improvements will occur to those skilled in the art. Such modifications could comprise providing a locating key for the guide element 32 such that during initial assembly the element 32 is located at a specific rotational orientation with respect to the capstan shaft 26 so that the opening 56 of the tape guide element is properly oriented facing the pressure roller wheel 40. This would involve a projection on the annular flange 50 and a corresponding indentation in the frame 19. In addition, instead of having the end portion 52 of the tape guide element 32 horseshoe-shaped, as best shown in FIG. 3, this element could be formed in other shapes as long as together the exterior surface of the end portion 52 forms an inclined plane which prevents insertion of the magnetic tape on the improper (left as in FIG. 2) side of the capstan shaft 26. All such modifications which retain the basic underlying principles disclosed and claimed herein are within the scope of this invention.

I claim:

1. An improved cassette tape player comprising:
   a tape player frame;
   at least one capstan shaft means rotatable with respect to said frame about an axis for providing tape driving movement to a tape to be inserted into said tape player, said capstan shaft means having a free upstanding end portion, an opposite end portion mounted to said frame, and an engaging portion between said end portions for drivingly engaging the inserted tape;
   at least one pressure roller means mounted to said frame and freely rotatable about an axis parallel to said capstan shaft axis, said pressure roller means disposed on one side of said capstan shaft axis and movable with respect to said capstan shaft means between a first position wherein said capstan shaft means and said pressure roller means are spaced apart and a second position wherein said pressure roller effectively contacts said tape-engaging portion of said capstan shaft means, said pressure roller means selectively frictionally captivating an inserted tape between said pressure roller means and said capstan shaft means to provide driving movement to said inserted tape;
   tape guide means mounted to said frame adjacent to said capstan shaft means, said tape guide means generally extending from said mounted end portion of said capstan shaft means to said free upstanding end portion of said capstan shaft means with said tape guide means including a first end portion extending beyond said free upstanding capstan shaft end portion, said guide first end portion effectively forming a tape guide plane beyond said capstan shaft free end portion which is inclined with respect to said capstan axis, and wherein during insertion of tape over said free upstanding end portion of said capstan shaft means said first end portion of said tape guide means positively positions inserted tape on said one side of said capstan shaft between said capstan shaft axis and said pressure roller axis with said capstan shaft means and said pressure roller means in said first position; and
   movable positioning means coupled to said tape player frame for receiving a cassette housing having tape within and inserting both a portion of the cassette carrier and the tape within the cassette carrier over both said free upstanding end portion of said capstan shaft means and said tape guide means first end portion with said tape within said cassette carrier being positioned between said capstan shaft means and said pressure roller means.

2. A cassette tape player according to claim 1 wherein tape guide means has a second end portion non-rotatably fixed to said frame, and said guide means has at least one stripper portion means between said first and second end portions disposed closely adjacent said tape engaging portion of capstan shaft means for preventing said tape from being wrapped around said capstan shaft means when said tape is being driven thereby.

3. A cassette tape player according to claim 2 wherein said tape guide means comprises a pair of said stripper portion means for preventing the wrapping of tape around said capstan shaft means, regardless of the rotational direction of said capstan shaft means, said pair of stripper portions forming an opening about said capstan shaft tape engaging portion and facing said pressure roller means which permits said pressure roller means to contact said tape engaging portion of said capstan shaft means in said second position.

4. A cassette tape player according to claims 1, 2 or 3 which includes a tubular bearing fixed to said frame and wherein said capstan shaft means comprises a cylindrical rod mounted in said tubular bearing.

5. A cassette tape player according to claim 4 wherein said bearing has a portion extending above a planar portion of said frame, and wherein said tape guide means includes a tubular base portion press fit over said extending bearing portion to provide alignment for said guide means.

6. A cassette tape player according to claim 5 wherein said tubular base portion of said tape guide means has a laterally extending flange which is mounted flush with and fixed to said planar portion of said frame.

7. A cassette tape player according to claim 6 wherein said flange is annular.

8. A cassette tape player according to claims 1, 2 or 3 wherein said tape guide means has a tapered exterior surface extending generally from said mounted end portion of said capstan shaft means to said free upstanding portion which is inclined with respect to said capstan shaft axis to provide for guiding a cassette housing.

9. A cassette tape player according to claim 1 wherein said guide plane formed by said first end portion of said tape guide means is disposed over at least a portion of the upward projection of said capstan shaft means in the direction of said capstan shaft axis.

10. A cassette tape player according to claim 1 wherein said tape guide means comprises a tubular base portion disposed about said capstan shaft means opposite end portion and said tape guide means has a laterally extending annular flange disposed about said base portion and mounted substantially flush with and fixed to said planar portion of said frame.

11. A cassette tape player according to claims 1, 2, 9 or 10 wherein said tape guide means is an integral unit.

12. A cassette tape player according to claim 1 wherein said capstan shaft free upstanding end portion and said tape engaging portion, as well as said tape guide means first end portion are dimensioned for fitting within a receiving opening in a cassette housing to be inserted into said tape player.

* * * * *